Patented July 31, 1934

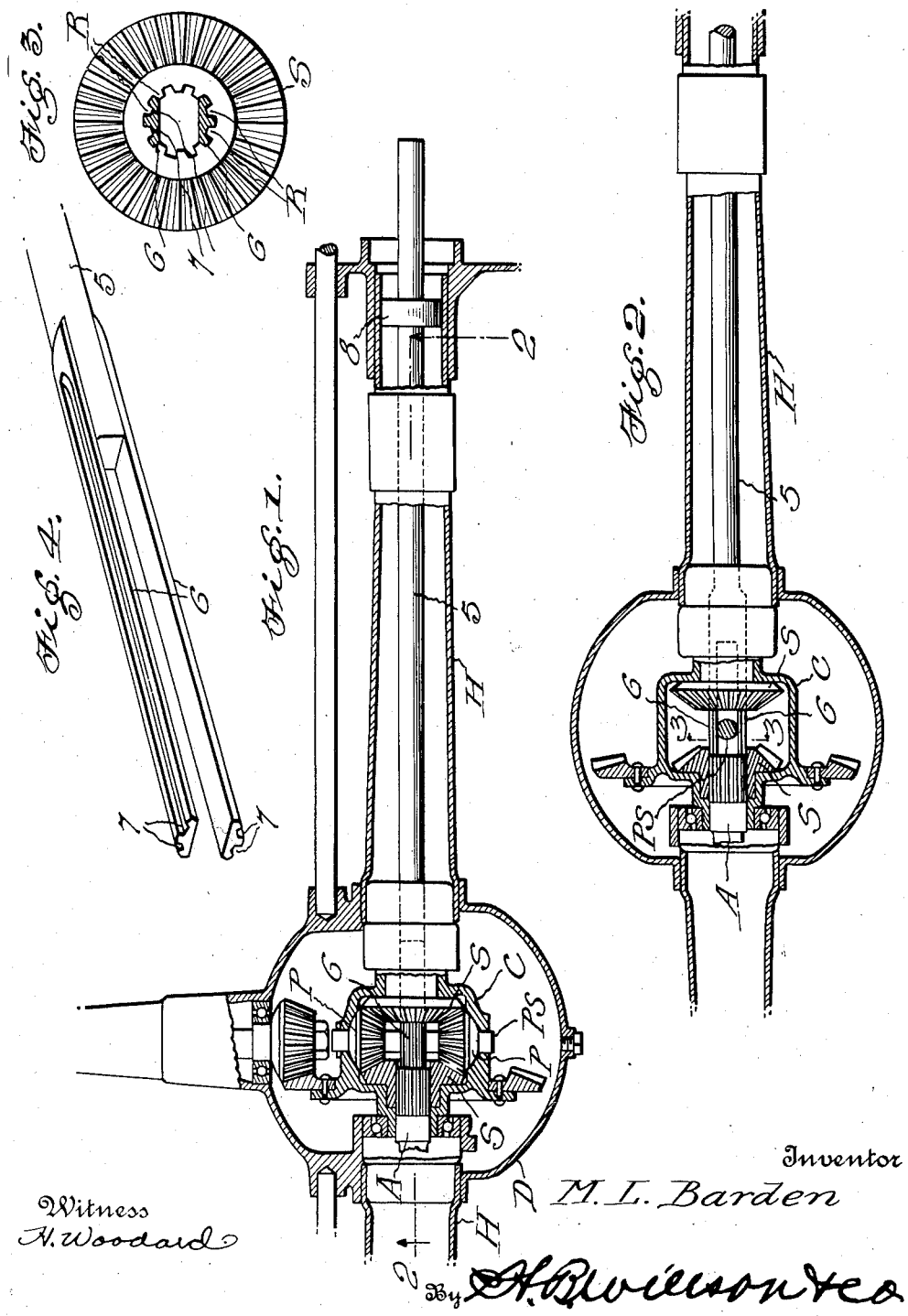

1,968,733

UNITED STATES PATENT OFFICE 1,968,733

AXLE STUB-REMOVING TOOL

Myron L. Barden, Plover, Wis.

Application May 20, 1930, Serial No. 454,091

3 Claims. (Cl. 29—85)

Certain makes of automobiles having full or semi-floating rear axles, embody a differential pinion shaft extending diametrically between the two rear axle sections. This pinion shaft interferes with removing the inner end or stub of a broken axle section from the co-acting differential side gear, as it prevents access to said stub by means of a rod inserted into the axle housing from the opposite side of the machine. Hence, it is now necessary to tear down the entire rear end in order to remove such a stub from a differential side gear. It is the object of my invention however to provide a unique form of tool whereby all of this difficulty is effectively overcome, it being only necessary to withdraw the axle sections from the housing in order that the tool may be used. In some machines, such withdrawal of the axle sections, entails removal of the wheels also, whereas in others, the wheels remain mounted upon the ends of the axle housing.

With the foregoing in view, the invention resides in the novel subject matter hereinafter described and claimed, description being accomplished by reference to the accompanying drawing.

Fig. 1 is a horizontal sectional view partly in elevation showing the application of the invention.

Fig. 2 is a detail vertical sectional view on line 2—2 of Fig. 1.

Fig. 3 is a detail vertical sectional view on line 3—3 of Fig. 2.

Fig. 4 is a perspective view of the inner end of the tool.

In the drawing above briefly described, D denotes the usual differential housing from which the rear axle housing H extends, C has reference to the rotatable differential case, S indicates the two side gears of the differential, P refers to the differential pinions and PS denotes the pinion-carrying shaft which extends diametrically between the two side gears S. The hubs of these gears are provided with the usual internal ribs R for driving engagement with grooves in the inner ends of the rear axle sections, and at the left of Fig. 1, the inner end or stub A of one of said axle sections, is shown engaged with one of the side gears S, it being assumed that said stub has been broken from the remainder of said axle section. By insertion of a rod from the opposite side of the car into the axle housing H, the broken axle end A cannot be reached, due to the fact that the rod will strike the pinion shaft PS. My invention however provides a novel tool whereby the broken axle stub may be engaged and driven or forced from the side gear into the axle housing, from which it may be easily removed.

The tool embodies a metal rod 5 substantially as long as an axle section and adapted for inward insertion through one end of the axle housing. The inner end of this rod is provided with two parallel laterally spaced arms 6 which are of a length adapting them for passage through the hubs of both of the side gears S, said arms then straddling the pinion shaft as shown in Figs. 1 and 2. The arms 6 may be formed integrally with the arm 5 or they may be separate therefrom and welded or otherwise secured thereto so that virtually an integral structure exists. The outer sides of these arms, in the preferred construction, are of convex form transversely, said outer sides being provided with parallel longitudinal grooves 7 adapted to receive certain of the ribs R of the gears S. By constructing the arms in this manner, they may have greater cross-sectional area and hence greater strength than if otherwise formed, for if the outer sides of said arms were plain, said arms would have to be very thin in order to permit them to pass through the gears and still straddle the shaft PS.

Near its other end, the rod 5 is preferably provided with a head 8 for reception in the axle housing to center said outer end of the rod, preventing it from binding in the gears.

It will be seen from the foregoing that with the use of the invention, it will be an easy matter to remove a broken axle stub from a differential side gear, without the necessity of tearing down the entire rear end. After removal of the broken axle section and the other axle section, the rod 5 may be inserted into the housing which was occupied by the latter, inwardly inserted through one of the side gears S astride the pinion shaft PS and then driven or forced further inward to slide the broken axle stub from the other side gear into the housing, from which it may be easily removed.

On account of the existing advantages for the details disclosed, they are preferably followed. However, within the scope of the invention as claimed, variations may be made.

I claim:—

1. A tool for driving out the inner end of a broken rear axle section from a side gear of an automobile differential, comprising a rod substantially as long as a conventional automobile rear axle section, said rod having sufficient rigidity to withstand forcible longitudinal driving, two relatively fixed normally parallel arms fixedly secured to the inner end of said rod and of a transverse size adapting them for passage through the axle-engaging side gears of a differential, said arms being laterally spaced a distance adapting them to straddle the pinion shaft of the differential, being of a length adapting them for passage entirely through one of the side gears and substantially through the other side gear, and being sufficiently rigid to withstand the aforesaid driving of the rod and force out the broken axle end when the free ends of the arms abut said broken axle end in said other side gear, and rod-centering means near the outer end of said rod and of a size for reception within the outer end of a rear axle housing.

2. A tool of the type described comprising a straight elongated shank having a driving head at one end and having its other end bifurcated to provide a pair of spaced rigid legs adapted to pass at opposite sides of the planetary gear carrying shaft of the differential gearing of a rear axle assembly and to engage the inner end of the inner portion of a broken axle of said assembly, said legs being straight and parallel with the longitudinal axis of said shank, and said shank and legs being of a form and length to permit use of the tool in driving the said axle portion outwardly from its normal position in said assembly.

3. A tool of the type described comprising a straight elongated shank having a driving head at one end and having at its other end a rigid leg offset laterally of the shank to pass at one side of the planetary gear carrying shaft of the differential gearing of a rear axle assembly and to engage the inner end of the inner portion of a broken axle of said assembly, said leg being straight and parallel with the longitudinal axis of said shank, and said shank and leg being of a form and length to permit use of the tool in driving the said axle portion outwardly from its normal position in said assembly.

MYRON L. BARDEN.